US012563230B2

(12) United States Patent
Kim et al.

(10) Patent No.: US 12,563,230 B2
(45) Date of Patent: Feb. 24, 2026

(54) METHOD AND APPARATUS FOR ADJUSTING ADAPTIVE PATCH PACKING BLOCK SIZE

(71) Applicant: KOREA ELECTRONICS TECHNOLOGY INSTITUTE, Seongnam-si (KR)

(72) Inventors: Yong Hwan Kim, Anyang-si (KR); Hyun-Ho Kim, Seongnam-si (KR); Sung-Gyun Lim, Seoul (KR); Yura Kim, Hwaseong-si (KR)

(73) Assignee: KOREA ELECTRONICS TECHNOLOGY INSTITUTE, Seongnam-si (KR)

( * ) Notice: Subject to any disclaimer, the term of this patent is extended or adjusted under 35 U.S.C. 154(b) by 0 days.

(21) Appl. No.: 18/400,399

(22) Filed: Dec. 29, 2023

(65) Prior Publication Data

US 2025/0150625 A1     May 8, 2025

(30) Foreign Application Priority Data

Nov. 2, 2023     (KR) ........................ 10-2023-0150162

(51) Int. Cl.
*H04N 7/12* (2006.01)
*H04N 19/119* (2014.01)
(Continued)

(52) U.S. Cl.
CPC ......... *H04N 19/597* (2014.11); *H04N 19/119* (2014.11); *H04N 19/136* (2014.11); *H04N 19/172* (2014.11); *H04N 19/176* (2014.11)

(58) Field of Classification Search
CPC .. H04N 19/597; H04N 19/119; H04N 19/136; H04N 19/172; H04N 19/176
(Continued)

(56) References Cited

U.S. PATENT DOCUMENTS 9,813,707 B2 * 11/2017 Zhang .................. H04N 19/139
2021/0006833 A1 * 1/2021 Tourapis ................... G06T 7/10
(Continued)

FOREIGN PATENT DOCUMENTS

KR     10-2023-0082547 A     6/2023

OTHER PUBLICATIONS

Kim et al., "Adaptive Patch Packing Block Size Adjustment", International Organisation for Standardisation, ISO/IEC JTC 1/SC 29/WG 4 MPEG Video Coding, Oct. 2023, Hanover, in 11 pages.

(Continued)

*Primary Examiner* — Gims S Philippe

(74) *Attorney, Agent, or Firm* — Knobbe, Martens, Olson & Bear, LLP

(57) ABSTRACT

Proposed are a method and apparatus for adjusting an adaptive patch packing block size of a multi-view video. The method may include receiving an initial patch packing block size as an input, and calculating a width and height of an atlas frame according to the patch packing block size. The method may also include performing patch packing according to the patch packing block size and a size of the atlas frame, and calculating a ratio of the number of valid pixels in patches that are not packed and discarded as a result of the patch packing. The method may further include adjusting adaptively the patch packing block size according to the calculated ratio of the number of valid pixels in the discarded patches, and re-performing the patch packing according to the adjusted patch packing block size.

8 Claims, 3 Drawing Sheets

(51) Int. Cl.
 *H04N 19/136*   (2014.01)
 *H04N 19/172*   (2014.01)
 *H04N 19/176*   (2014.01)
 *H04N 19/597*   (2014.01)

(58) Field of Classification Search
 USPC ..................................................... 375/240.02
 See application file for complete search history.

(56)       References Cited

U.S. PATENT DOCUMENTS

| | | | |
|---|---|---|---|
| 2021/0321072 A1* | 10/2021 | Oh ........................ | H04N 13/194 |
| 2023/0050860 A1* | 2/2023 | Ilola ..................... | H04N 19/597 |
| 2024/0161382 A1* | 5/2024 | Kim ....................... | G06V 10/54 |
| 2025/0097460 A1* | 3/2025 | Oh ........................ | H04N 19/597 |

OTHER PUBLICATIONS

Kim, "Adaptive Patch Packing Block Size Adjustment", Korea Electronics Technology Institute presentation, Oct. 22, 2023, in 28 pages.
Notice of Allowance in corresponding KR Application No. 10-2023-0150162 dated Jan. 21, 2026.

\* cited by examiner

FIG. 4A
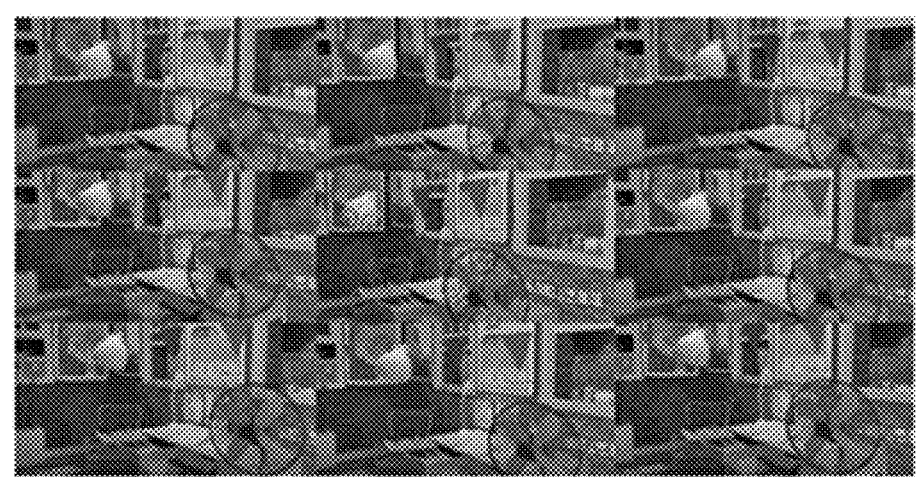
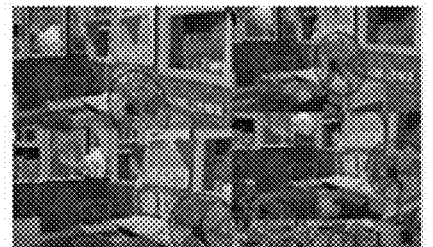 
FIG. 4B

METHOD AND APPARATUS FOR ADJUSTING ADAPTIVE PATCH PACKING BLOCK SIZE

CROSS-REFERENCE TO RELATED APPLICATION

This application claims priority to and the benefit of Korean Patent Application No. 2023-0150162, filed on Nov. 2, 2023, the disclosure of which is incorporated herein by reference in its entirety.

STATEMENT REGARDING GOVERNMENT-SPONSORED R&D

The present disclosure is derived from research supported by Institute of Information & Communications Technology Planning & Evaluation (IITP) grant funded by the Korea government (MSIT) [Project Unique Number: 1711193288, Project Number: 2020-0-00920, Research Project Name: Development of Ultra High Resolution Unstructured Plenoptic Video Storage/Compress/Streaming Technology for Medium to Large Space, Research Period: Apr. 1, 2020 to Dec. 31, 2023].

BACKGROUND

Technical Field

The present disclosure relates to a preprocessing technique for multi-view video coding, and more particularly, to a technique that adaptively adjusts a patch packing block size for every group of frames (GOF).

Description of Related Technology

A multi-view video, which is one type of immersive realistic media, is one of the three-dimensional videos that provide a viewer with various viewpoints by synthesizing images captured with multiple cameras. This multi-view video has a characteristic of being able to provide the viewer with a viewpoint that the viewer wants.

SUMMARY

One aspect is a method and apparatus for adaptively adjusting a patch packing block size when an atlas frame is configured in a preprocessing model of a multi-view video.

Another aspect is a method of adjusting an adaptive patch packing block size that may include receiving an initial patch packing block size as, calculating a size of an atlas frame according to the initial patch packing block size, performing patch packing according to the initial patch packing block size and the size of the atlas frame, calculating a ratio of the number of valid pixels in patches that are not packed and discarded as a result of the patch packing, adaptively adjusting the patch packing block size according to the calculated ratio of the number of valid pixels in the discarded patches, and re-performing the patch packing according to the adjusted patch packing block size.

In the calculating of the ratio of the number of valid pixels in the discarded patches, the ratio of the number of valid pixels in the discarded patches may be calculated as a value that is obtained by subtracting the number of valid pixels in the packed patches from the number of valid pixels in all patches and dividing the result by the number of valid pixels in all patches.

When the calculated ratio of the number of valid pixels in the discarded patches is equal to or greater than a first threshold value, the patch packing block size may be reduced by a predetermined ratio.

The adjusting of the patch packing block size and the re-performing of the patch packing may be repeated until the ratio of the number of valid pixels in the discarded patches calculated as a result of performing the patch packing according to the reduced patch packing block size is less than the first threshold value.

After repeating the adjusting of the patch packing block size and the re-performing of the patch packing a predetermined number of times, the patch packing block size adjustment may be stopped even when the calculated ratio of the number of valid pixels in the discarded patches is equal to or greater than the first threshold value.

The patch packing block size may be enlarged by a predetermined ratio when the calculated ratio of the number of valid pixels in the discarded patches is equal to or less than a second threshold value.

Another aspect is an apparatus for adjusting an adaptive patch packing block size, that may include an atlas frame calculation unit configured to calculate a size of an atlas frame by an initial patch packing block size, a patch packing unit configured to perform patch packing according to the initial patch packing block size and the size of the atlas frame, and a patch packing block size adjustment unit configured to calculate a ratio of the number of valid pixels in patches that are not packed and discarded as a result of performing the patch packing by the patch packing unit, and adaptively adjust a patch packing block size accordingly, wherein the patch packing unit may re-perform the patch packing according to the adjusted patch packing block size when the patch packing block size is adjusted by the patch packing block size adjustment unit.

The patch packing block size adjustment unit may calculate a value that is obtained by subtracting the number of valid pixels in the packed patches from the number of valid pixels in all patches and dividing the result by the number of valid pixels in all patches as the ratio of the number of valid pixels in the discarded patches.

The patch packing block size adjustment unit may reduce the patch packing block size by a predetermined ratio when the calculated ratio of the number of valid pixels in the discarded patches is equal to or greater than a first threshold value.

The patch packing unit may repeat the re-performing of the patch packing according to the patch packing block size adjusted by the patch packing block size adjustment unit, until the ratio of the number of valid pixels in the discarded patches calculated by the patch packing block size adjustment unit is less than the first threshold value, after performing the patch packing according to the reduced patch packing block size.

The patch packing block size adjustment unit may stop adjusting the patch packing block size even when the ratio of the number of valid pixels in the discarded patches calculated by the patch packing block size adjustment unit is equal to or greater than the first threshold value, after the patch packing unit has repeated the re-performing of the patch packing a predetermined number of times according to the patch packing block size adjusted by the patch packing block size adjustment unit.

The patch packing block size adjustment unit may enlarge the patch packing block size by a predetermined ratio when the calculated ratio of the number of valid pixels in the discarded patches is equal to or less than a second threshold value.

Aspects of the present disclosure are not limited to the above-mentioned aspects, and other aspects, which are not mentioned above, may be clearly understood from the following descriptions by those skilled in the art to which the present disclosure pertains.

BRIEF DESCRIPTION OF THE DRAWINGS

The accompanying drawings, which are included to provide a further understanding of the disclosure and are incorporated in and constitute a part of this application, illustrate embodiments of the disclosure and together with the description serve to explain the principle of the disclosure.

FIG. 4A and FIG. 4B illustrate an example of a configuration of an atlas frame for multi-view video transmission.

DETAILED DESCRIPTION

Figure 1:
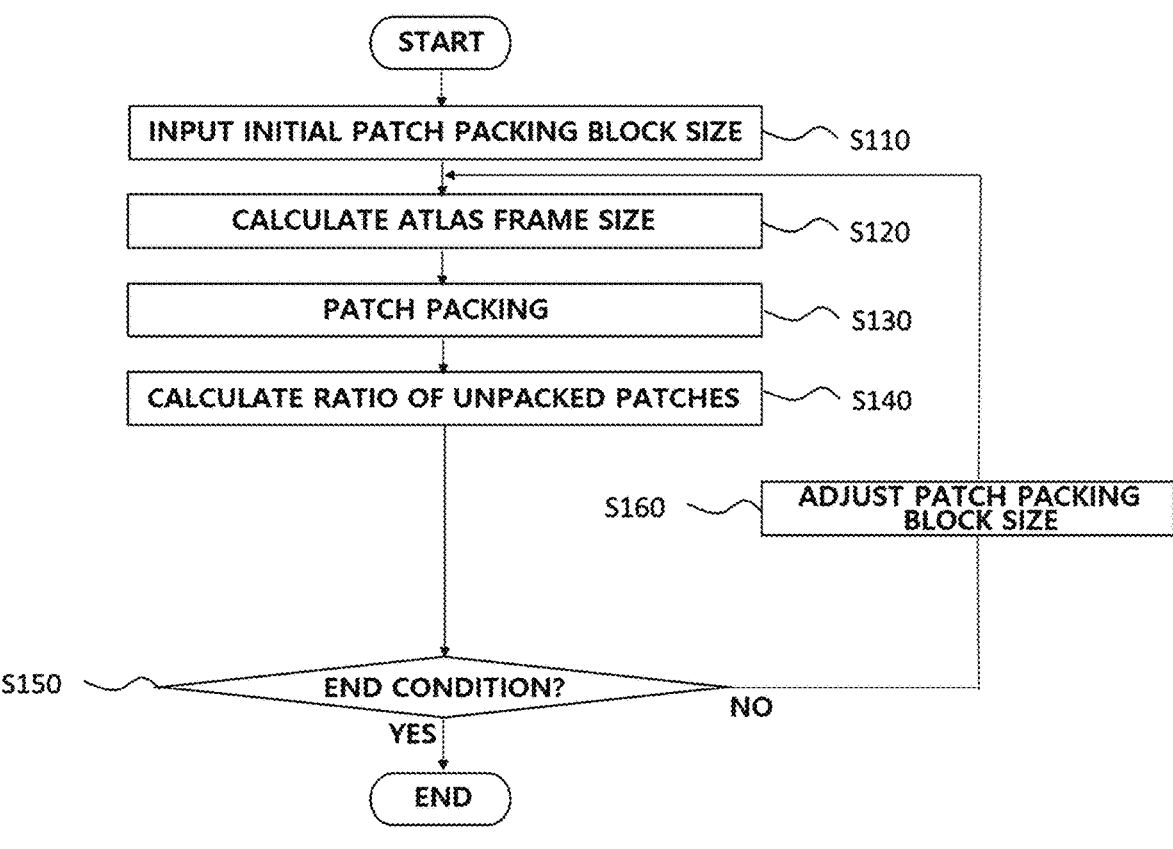
FIG. 1 is a schematic flowchart of a method of adjusting an adaptive patch packing block size according to an exemplary embodiment of the present disclosure.

When a multi-view video is encoded, instead of transmitting images from all viewpoints, data from a specific viewpoint is transmitted along with a depth image, and images from omitted intermediate viewpoints are synthesized using the depth image and then provided. Therefore, the depth image, which represents information on a distance between an object and a camera, plays an important role in multiview video coding, and is usually transmitted with an amount of information corresponding to texture information of the viewpoint to be transmitted.

However, just transmitting multiple pieces of specific viewpoint data takes up several to tens of times a bandwidth required to transmit a general two-dimensional (2D) image. When such a large amount of data is encoded with a codec optimized for compression of a conventional 2D image, it may be difficult to achieve proper encoding performance in terms of compression speed or efficiency.

Therefore, in immersive video compression, which is currently being standardized by the Moving Picture Experts Group (MPEG), multiple viewpoint images are received as an input and classified into a small number of basic view images and additional view images, and remaining regions excluding overlapping regions are defined as patches, which are encoded by creating a new frame referred to as an atlas.

By the way, in the process of packing patches to create the atlas frame, a patch packing block size is fixed and used. When the patch packing block size is too large, small patches that are not packed into the atlas frame are discarded, and when the patch packing block size is too small, grid-shaped edge information around the patches increases, which may result in a decrease in the encoding efficiency of the atlas frame and negatively affect the final synthesis performance.

The inventors of the present disclosure have conducted research to solve these problems, and have completed the present disclosure after much effort to develop a preprocessing method that can improve the encoding efficiency and synthesis performance of the multi-view video by adaptively adjusting the patch packing block size.

The above-mentioned objects, features, and advantages of the present disclosure will become more apparent from the following detailed description described with reference to the accompanying drawings, and thus the technical spirit of the present disclosure will be easily carried out by those skilled in the art to which the present disclosure pertains. In addition, in the description of the present disclosure, the specific descriptions of publicly known technologies related with the present disclosure will be omitted when it is determined that the specific descriptions may unnecessarily obscure the subject matter of the present disclosure.

The terms used in the present specification are for explaining the exemplary embodiments, not for limiting the present disclosure. Unless particularly stated otherwise in the present specification, a singular form also includes a plural form in some cases. In the present specification, the terms "including," "having," "arranging," or "having" do not exclude the existence or addition of one or more other constituent elements in addition to the mentioned constituent elements.

In the present specification, the terms "or", "at least one" and the like may refer to one of the words listed together, or to a combination of two or more. For example, "A or B" and "at least one of A or B" may include only one of A or B, or may include both A and B.

In the present specification, the descriptions that follow "for example" and the like may not exactly match the information presented, such as the characteristics, variables, or values cited, and should not limit the implementation of the invention according to various embodiments of the invention due to effects such as allowable errors, measurement errors, limits of measurement accuracy, and variations including other factors known in the art.

In the present specification, when one constituent element is described as being "coupled" or "connected" to another constituent element, it should be understood that one constituent element can be coupled or connected directly to another constituent element, and an intervening constituent element can also be present between the constituent elements. In contrast, when one constituent element is described as being "coupled directly to" or "connected directly to" another constituent element, it should be understood that no intervening constituent element is present between the constituent elements.

In the present specification, when one constituent element is described as being "on" or "in contact with" another constituent element, it should be understood that one constituent element may be directly in contact with or connected to another constituent element, but an intervening constituent element may be present between the constituent elements. In contrast, when one constituent element is described as being "directly above" or "directly in contact with" another constituent element, it may be understood that no intervening constituent element is present between the constituent elements. Other expressions that describe relationships between constituent elements, for example, "between", "directly between", and the like, may be interpreted similarly.

In the present specification, the terms such as "first" and "second" may be used to describe various constituent elements, but the corresponding constituent elements should not be limited by the terms above. In addition, the terms above should not be interpreted to limit the order of each constituent element and may be used to distinguish one constituent element from another constituent element. For example, a first constituent element may be referred to as a second constituent element, and similarly, the second constituent element may be referred to as the first constituent element.

Unless otherwise defined, all terms used in the present specification may be used as the meaning which may be commonly understood by the person with ordinary skill in the art, to which the present disclosure belongs. In addition, terms defined in a generally used dictionary shall not be construed in ideal or excessively formal meanings unless they are clearly and specially defined in the present specification.

Hereinafter, an exemplary embodiment according to the present disclosure will be described in detail with reference to the accompanying drawings.

Figure 3:
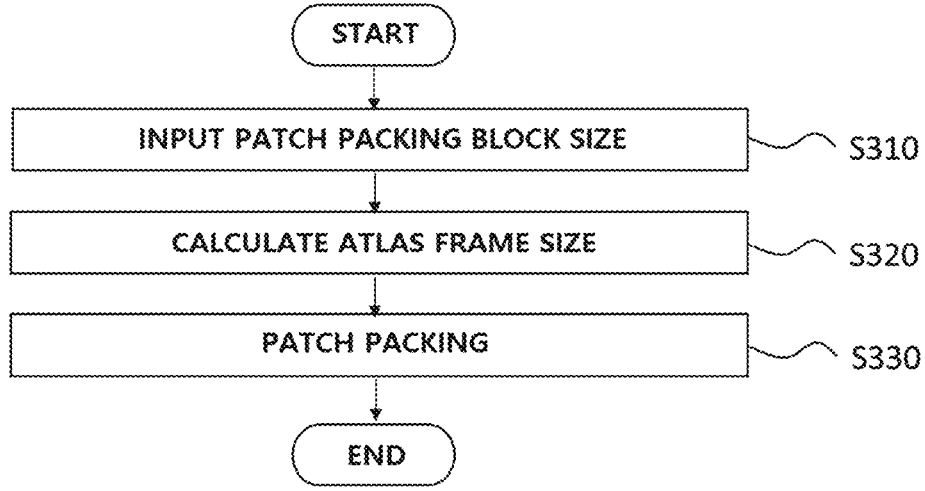
FIG. 3 is a schematic flowchart of a general patch packing method.

FIG. 3 illustrates a schematic flowchart of a general patch packing method.

Recently, the ISO/IEC MPEG-I Immersive Video (MIV) immersive video compression standard, which is in the process of being standardized, has developed the test model for immersive video (TMIV), which is a test model for effectively encoding a multi-view video. The TMIV is a model that performs preprocessing on a multi-view video before the multi-view video is input to a 2D video encoder.

The TMIV first receives multiple viewpoint images as an input, selects one or some basic view images of the images, and classifies the remaining images other than the basic view images as additional view images. Each additional view image is synthesized from the same viewpoint as the basic view image based on a depth image corresponding to the additional view image.

The synthesized image is then compared to the basic view image, and a region that is able to be synthesized by information on the basic view image, i.e., an overlapping region, is removed, and only part that is not able to be synthesized by the information on the basic view image remains. The remaining region that is not removed is defined as a patch.

A new frame that combines the patches generated from each additional view image into a single frame is an atlas frame (image), and a process of generating the atlas frame is referred to as patch packing.

The atlas frame in which the patches are packed and the basic view image are input to the 2D encoder and encoding is performed.

The patch packing proceeds in a way that minimizes the region occupied by the patches within the atlas frame, and is performed in the following sequence.

First, a block size for patch packing is input (S310).

The patches are packed with a multiple of the patch packing block size. Therefore, when the patch packing block size is larger than a patch size, a region that is not needed for synthesis around the patch (non-valid region) is also packed in addition to the patch (valid region). The non-valid region may provide additional information when the image is subsequently synthesized with the patches, which may improve the synthesis performance.

When the patch packing block size is input, a size of the atlas frame is calculated accordingly (S320).

Horizontal and vertical dimensions of the atlas frame are determined by the patch packing block size.

When the size of the atlas frame is determined, patch packing is performed (S330).

For the patch packing, the generated patches are first sorted by size, and a position to be packed into the atlas frame is searched for, starting with the largest patch.

When an optimal position is determined as a result of the search, information on the corresponding position, information on the size and rotation of the patch, and the like are stored as metadata.

In this way, the region searching and packing are repeated until the packing of all patches has been completed.

FIG. 4A and FIG. 4B illustrate an example of the atlas frame in which patch packing has been performed in this way.

FIG. 4A illustrates an example of an original image including depth information, and FIG. 4B illustrates an example of atlas frames for which patch packing has been completed. It can be seen in the atlas frame that there is a gray region in which the patches are not disposed.

However, when the packing is performed by fixing the patch packing block size to a value initially inputted, each patch size is all expanded in case the patch packing block size is too large, so there are not enough regions in the atlas frame for the patch packing, and thus the patches with smaller sizes are discarded. When the patch packing block size is too small, all patches are more likely to be packed, but the grid edge information around the patches increases, which may cause a problem of decreasing the encoding efficiency of the atlas frame.

Therefore, the present disclosure is directed to solving these problems by adaptively adjusting the patch packing block size.

FIG. 1 is a schematic flowchart of a method of adjusting an adaptive patch packing block size according to an exemplary embodiment of the present disclosure.

A method of adjusting an adaptive patch packing block size according to the present disclosure may be performed by a controller including one or more processors and a memory.

First, an initial patch packing block size is input (S110), and then a size of an atlas frame (horizontal and vertical dimensions) is calculated according to the initial patch packing block size (S120).

In this case, parameters and lists needed for patch packing are generated and stored.

When the size of the atlas frame is determined, the patch packing proceeds according to the size of the atlas frame and the initial patch packing block size (S130).

Before the patch packing step, the number of valid pixels of all patches to be packed is first summed and stored.

The patch packing is performed as described above, in such a way that the position and rotation information is determined by searching for empty regions within the atlas frame starting from the largest patch.

After the patch packing is completed by the initial patch packing block size, a ratio of unpacked and discarded patches is calculated (S140).

The ratio of discarded patches may be determined by the following equation.

$$\text{Discarded patch ratio} = \frac{V_t - V_p}{V_t} \times 100\ (\%),$$

$$\text{where } V_t = \sum_{i}^{n} \text{count}\,(\text{patches}\,[i])$$

$$V_p = \sum_{i}^{m} \text{count}\,(\text{packed patches}\,[i])$$

Here, i is a patch index, and count(.) is a function that returns the number of valid pixels in patches[i]. Therefore, $V_t$ is the number of valid pixels in all patches, and $V_p$ is the number of valid pixels in the packed patches.

By obtaining the discarded patch ratio, i.e., the ratio of unpacked patches among all patches (Discarded patch ratio), and adaptively adjusting the patch packing block size, the present disclosure can solve the problem in the related art.

Specifically, the ratio of the unpacked patches is determined to be within a range of a predetermined ratio (S150), and when the ratio is within the predetermined ratio, the patch packing is terminated. When the ratio deviates from the predetermined ratio, the patch packing block size is adjusted (S160), and the calculation of the size of the atlas frame and the patch packing is performed again.

The process of determining whether the ratio of the unpacked patches is in the range of the predetermined ratio (S150) may be specifically as follows.

First, when the discarded patch ratio is equal to or greater than a predetermined reference value (a first threshold value), the patch packing block size may be reduced to re-perform the patch packing.

The first threshold value may be, for example, 10%, 5%, 3%, or the like, but is not limited thereto. In the present disclosure, 3% may be the first threshold value.

In the adjustment of the patch packing block size, the patch packing block size may be halved when the ratio of discarded patches is equal to or greater than the first threshold value, but is not limited thereto. For example, the previous patch packing block size may be reduced by 10%, 20%, or 30%.

The patch packing may be repeated multiple times. For example, the patch packing is repeated by reducing the patch packing block size until the ratio of discarded patches is less than the first threshold value, or until the ratio of discarded patches is 0%.

In this case, the adjustment of the patch packing block size may also be variably performed. For example, the patch packing block size may be halved in a first repetition, reduced by 30% in a second repetition, and reduced by 10% in a third repetition, but is not limited thereto. In contrast, the patch packing block size may be reduced by 10% in the first repetition, 20% in the second repetition, and 30% in the third repetition.

The number of repetitions of the patch packing may also be predetermined. For example, when the number of repetitions of the patch packing is set to be three, the repetition is stopped and the patch packing is completed even if the ratio of discarded patches is equal to or greater than the first threshold value. When the patch packing block size is halved every time, the patch packing block size becomes ⅛ of the initial patch packing block size in the last repetition in case that the patch packing is repeated three times.

In contrast to the example above, the patch packing may also be performed again by increasing the patch packing block size when the ratio of discarded patches is equal to or less than a predetermined reference value (a second threshold value), or when the ratio is 0%.

For example, because the patch packing block size may be too small when the calculated ratio of discarded patches is 0%, the patch packing block size may be increased to re-perform the patch packing.

The patch packing block size may be increased, for example, by doubling, or by a ratio, such as 10%, 20%, or 30%, but is not limited thereto.

When the ratio of discarded patches exceeds the second threshold value as a result of re-performing the patch packing by increasing the patch packing block size, the patch packing may be completed. For example, when the ratio of discarded patches is 0% as a result of the patch packing according to the initial patch packing block size, and the ratio of discarded patches exceeds 0% as a result of re-performing the patch packing by increasing the patch packing block size, the patch packing repetition is stopped and the patch packing is completed.

As with decreasing the patch packing block size, even when the patch packing block size is increased, after the patch packing block size has been increased a predetermined number of times, the patch packing may be terminated even if the ratio of discarded patches is equal to or less than the second threshold value.

When the ratio of discarded patches during the patch packing repetition deviates from the predetermined range, for example, exceeding the second threshold value and below the first threshold value, the patch packing may be performed by reverting the patch packing block size to a size before the patch packing block size was adjusted, and the patch packing may be terminated.

For example, when the patch packing is performed and the resulting ratio of discarded patches is equal to or greater than the first threshold value, the patch packing block size is then halved and the patch packing is performed again, and the resulting ratio of discarded patches is equal to or less than the second threshold value, the patch packing is then performed back to the initial patch packing block size and the patch packing is terminated.

Alternatively, the patch packing may be performed by increasing the patch packing block size again without returning to the initial patch packing block size, and the ratio of discarded patches may be recalculated to determine whether to repeat the patch packing. In this case, the increased patch packing block size needs to be smaller than an initially increased patch packing block size.

When the patch packing block size changes every GOF, the size of the atlas frame may also change to match the changed patch packing block size.

Alternatively, the size of the atlas frame, which is determined according to the initial patch packing block size, may remain the same and only the patch packing block size may be changed.

Figure 2:
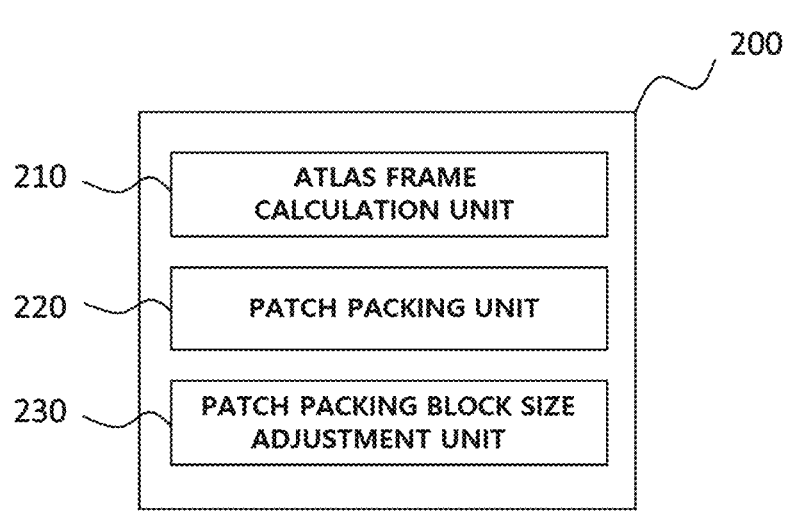
FIG. 2 is a schematic block diagram of an apparatus for adjusting an adaptive patch packing block size according to another exemplary embodiment of the present disclosure.

FIG. 2 is a schematic block diagram of an apparatus for adjusting an adaptive patch packing block size according to another exemplary embodiment of the present disclosure.

An apparatus 200 for adjusting an adaptive patch packing block size according to the present disclosure may include an atlas frame calculation unit (or an atlas frame calculation processor) 210, a patch packing unit (or a patch packing processor) 220, and a patch packing block size adjustment unit (or a patch packing block size adjustment processor) 230.

To this end, the apparatus 200 for adjusting an adaptive patch packing block size may include one or more processors and a memory (not illustrated).

For example, the apparatus 200 for adjusting an adaptive patch packing block size may be a terminal capable of computing. For example, the apparatus 200 for adjusting an adaptive patch packing block size may be a general-purpose computing system, such as a desktop personal computer, a laptop personal computer, a tablet personal computer, a netbook computer, a workstation, a personal digital assistant (PDA), a smart phone, a smart pad, or a mobile phone, or a dedicated embedded system implemented based on embedded Linux or the like, but is not limited thereto.

The memory stores various information necessary to operate the apparatus 200 for adjusting an adaptive patch packing block size. For example, the information stored in the memory may include multi-view video information for patch packing, various parameter and list information for patch packing, and program information for performing a patch packing method, but is not limited thereto.

For example, the memory may include, depending on a type thereof, a hard disk type, a magnetic media type, a compact disc read only memory (CD-ROM), an optical media type, a magneto-optical media type, a multimedia card micro type, a flash memory type, a read only memory (ROM) type, or a random-access memory (RAM) type, but is not limited thereto. In addition, the memory may be, depending on usage/location thereof, a cache, a buffer, a primary memory device, an auxiliary memory device, or a storage system provided separately, but is not limited thereto.

The processor may perform various control operations of the apparatus 200 for adjusting an adaptive patch packing block size. That is, the processor may control to perform a method of patch packing that will be described below, and may control an operation of remaining configuration of the apparatus 200 for adjusting an adaptive patch packing block size, that is, the atlas frame calculation unit 210, the patch packing unit 220, the patch packing block size adjustment unit 230, the memory, and the like.

For example, the processor may include a processor, which is hardware, or a process, which is software that performs on the corresponding processor, but is not limited thereto. For example, the processor may include a microprocessor, a central processing unit (CPU), a processor core, a multiprocessor, an application-specific integrated circuit (ASIC), a field programmable gate array (FPGA), or the like, but is not limited thereto.

The atlas frame calculation unit 210 calculates the size of the atlas frame, that is, the horizontal and vertical dimensions, to be generated according to the patch packing block size.

When the patch packing block size changes every GOF, the atlas frame calculation unit 210 may also change the size of the atlas frame to match the changed patch packing block size.

Alternatively, the atlas frame calculation unit 210 may maintain the size of the atlas frame determined by the initial patch packing block size as it is regardless of the patch packing block size.

The patch packing unit 220 performs the patch packing according to the patch packing block size and the size of the atlas frame.

The patch packing unit 220 also performs the initial patch packing, and then adjusts the patch packing block size by calculating the ratio of discarded patches in the patch packing block size adjustment unit 230, and repeats the patch packing again accordingly.

To this end, the patch packing block size adjustment unit 230 calculates the ratio of patches that are discarded without being packed, and adjusts the patch packing block size accordingly to determine whether the patch packing unit 220 repeats the patch packing.

The patch packing block size adjustment unit 230 calculates a ratio of the number of valid pixels in all patches to the number of valid pixels in patches that are discarded without being packed into the atlas frame, and determines whether to repeat the patch packing accordingly.

For example, when the ratio of discarded patches is below the first threshold value and above the second threshold value, patch packing repetitions may be stopped, or the patch packing repetitions may be stopped after the patch packing has been repeated a predetermined number of times, even if the ratio of discarded patches does not fall within a predetermined range. The detailed description of the method of adjusting the patch packing block size is the same as described above.

The present disclosure, configured as described above, has advantages in that the patch packing block size can be adaptively adjusted according to the ratio of discarded patches in the patch packing of a multi-view video, so that efficient in-screen prediction or inter-screen prediction can be performed in the encoder, and that better synthesis performance can also be obtained when synthesizing viewpoints.

According to the present disclosure, there is an effect of performing efficient in-screen or inter-screen prediction in an encoder by adaptively adjusting a patch packing block size according to a ratio of discarded patches in the configuration of an atlas frame of a multi-view video.

In addition, there are advantages of having better synthesis performance when synthesizing viewpoints after encoding/decoding, and improving encoding visual quality and synthesis performance by increasing prediction efficiency.

The effects capable of being obtained by the present disclosure are not limited to the aforementioned effects, and other effects, which are not mentioned above, will be clearly understood by those skilled in the art from the following description.

While the detailed description of the present disclosure has described specific embodiments, various modifications may of course be made without departing from the scope of the invention. Accordingly, the scope of the present disclosure should not be limited to the described embodiments, and should be defined by the claims to be described below and those equivalents to the claims.

What is claimed is:

1. A method of adjusting an adaptive patch packing block size of a multi-view video, which is performed by an apparatus for adjusting a patch packing block size including one or more processors and a memory, the method comprising:

receiving an initial patch packing block size;

calculating a size of an atlas frame according to the initial patch packing block size;

performing patch packing according to the initial patch packing block size and the size of the atlas frame;

calculating a ratio of the number of valid pixels in patches that are not packed and discarded as a result of the patch packing;

adaptively adjusting the patch packing block size according to the calculated ratio of the number of valid pixels in the discarded patches; and re-performing the patch packing according to the adjusted patch packing block size, wherein, in response to the calculated ratio of the number of valid pixels in the discarded patches being equal to or greater than a first threshold value, the patch packing block size is reduced by a predetermined ratio, and wherein the adaptively adjusting and the re-performing are repeated until the ratio of the number of valid pixels in the discarded patches calculated as a result of performing the patch packing according to the reduced patch packing block size is less than the first threshold value.

2. The method of claim 1, wherein the ratio of the number of valid pixels in the discarded patches is calculated as a value that is obtained by subtracting the number of valid pixels in the packed patches from the number of valid pixels in all patches and dividing the result by the number of valid pixels in all patches.

3. The method of claim 1, wherein after repeating a predetermined number of times, the patch packing block size adjustment is stopped responsive to the calculated ratio of the number of valid pixels in the discarded patches being equal to or greater than the first threshold value.

4. The method of claim 1, wherein the patch packing block size is enlarged by a predetermined ratio in response to the calculated ratio of the number of valid pixels in the discarded patches being equal to or less than a second threshold value.

5. An apparatus for adjusting an adaptive patch packing block size of a multi-view video, the apparatus comprising:

an atlas frame calculation processor configured to calculate a size of an atlas frame according to an initial patch packing block size;

a patch packing processor configured to perform patch packing according to the initial patch packing block size and the size of the atlas frame; and a patch packing block size adjustment processor configured to calculate a ratio of the number of valid pixels in patches that are not packed and discarded as a result of performing the patch packing by the patch packing processor, and adaptively adjust a patch packing block size accordingly, wherein the patch packing processor is configured to re-perform the patch packing according to the adjusted patch packing block size in response to the patch packing block size being adjusted by the patch packing block size adjustment processor, wherein the patch packing block size adjustment processor is configured to reduce the patch packing block size by a predetermined ratio in response to the calculated ratio of the number of valid pixels in the discarded patches being equal to or greater than a first threshold value, and wherein the patch packing processor is configured to repeat the re-performing of the patch packing according to the patch packing block size adjusted by the patch packing block size adjustment processor, until the ratio of the number of valid pixels in the discarded patches calculated by the patch packing block size adjustment processor is less than the first threshold value after performing the patch packing according to the reduced patch packing block size.

6. The apparatus of claim 5, wherein the patch packing block size adjustment processor is configured to calculate a value that is obtained by subtracting the number of valid pixels in the packed patches from the number of valid pixels in all patches and dividing the result by the number of valid pixels in all patches as the ratio of the number of valid pixels in the discarded patches.

7. The apparatus of claim 5, wherein the patch packing block size adjustment processor is configured to stop adjusting the patch packing block size responsive to the ratio of the number of valid pixels in the discarded patches calculated by the patch packing block size adjustment processor being equal to or greater than the first threshold value, after the patch packing processor has repeated the re-performing of the patch packing a predetermined number of times according to the patch packing block size adjusted by the patch packing block size adjustment processor.

8. The apparatus of claim 5, wherein the patch packing block size adjustment processor is configured to enlarge the patch packing block size by a predetermined ratio in response to the calculated ratio of the number of valid pixels in the discarded patches being equal to or less than a second threshold value.

* * * * *